United States Patent
Camp, Jr. et al.

[19]

[11] Patent Number: 6,075,987
[45] Date of Patent: Jun. 13, 2000

[54] STAND ALONE GLOBAL POSITIONING SYSTEM (GPS) AND METHOD WITH HIGH SENSITIVITY

[75] Inventors: Thomas O. Camp, Jr., Chapel Hill; Thomas J. Makovicka, Raleigh, both of N.C.

[73] Assignee: Ericsson Inc., Research Triangle Park, N.C.

[21] Appl. No.: 09/032,053

[22] Filed: Feb. 27, 1998

[51] Int. Cl.$^7$ ........................................... H04G 7/20
[52] U.S. Cl. ........................... 455/427; 342/357.12
[58] Field of Search .................... 455/12.1, 13.1, 455/13.2, 456, 457, 427, 418, 405; 342/357.12, 357.15; 701/213

[56] References Cited

U.S. PATENT DOCUMENTS

| | | |
|---|---|---|
| 4,445,118 | 4/1984 | Taylor et al. . |
| 4,701,934 | 10/1987 | Jasper ........................................... 357/1 |
| 5,036,329 | 7/1991 | Ando ........................................ 342/357 |
| 5,319,374 | 6/1994 | Desai et al. . |
| 5,365,450 | 11/1994 | Schuchman et al. . |
| 5,663,734 | 9/1997 | Krasner . |
| 5,708,439 | 1/1998 | Lennen ..................................... 342/357 |
| 5,798,732 | 8/1998 | Eshenbach ............................... 342/357 |
| 5,808,582 | 9/1998 | Woo ........................................ 342/357 |

FOREIGN PATENT DOCUMENTS

| | | |
|---|---|---|
| 0635728 | 1/1995 | European Pat. Off. . |
| 0777129 | 6/1997 | European Pat. Off. . |
| 9428434 | 12/1994 | WIPO . |
| 9825157 | 6/1998 | WIPO . |
| 9838522 | 9/1998 | WIPO . |

*Primary Examiner*—Reinhard Eisenzopf
*Assistant Examiner*—N. Mehrpour
*Attorney, Agent, or Firm*—Wood, Phillips, VanSanten, Clark & Mortimer

[57] ABSTRACT

A method is provided for determining the position of a user terminal utilizing global positioning system (GPS) satellites, each of the GPS satellites transmitting a signal containing information indicative of the orbital parameters of the respective GPS satellite, timing and synchronization data and clock correction parameters. The method includes the steps of approximating an expected range of Doppler frequencies within which at least one GPS satellite should be located, within this range, searching for and acquiring a first GPS signal from a first GPS satellite at the user terminal strong enough to demodulate, the first GPS signal containing information indicative of the orbital parameters of the first GPS satellite, timing and synchronization data and clock correction parameters, demodulating the first GPS signal to obtain time of week information, measuring code phase synchronization for the first GPS signal utilizing the time of week information, searching for and acquiring second, third and fourth GPS signals at the user terminal from second, third and fourth GPS satellites, respectively, measuring code phase synchronizations for the second, third and fourth GPS signals utilizing the time of week information, and calculating the position of the user terminal utilizing the code phase synchronizations of the first through fourth GPS signals.

37 Claims, 3 Drawing Sheets

STAND ALONE GLOBAL POSITIONING SYSTEM (GPS) AND METHOD WITH HIGH SENSITIVITY

FIELD OF THE INVENTION

The present invention is directed toward a global positioning system (GPS) using a constellation of Earth-orbiting satellites having known positions and generating different signals to user terminals used to calculate user position and velocity and, more particularly, toward a GPS where there are not at least four GPS satellite signals of sufficient signal strength to demodulate directly in the terminal GPS receiver for the calculation of user position and velocity.

BACKGROUND OF THE INVENTION

Global positioning systems (GPS) generally include a constellation of Earth-orbiting satellites which transmit pseudo-random ranging signals from which user terminals can calculate their three-dimensional location, velocity and timing information anywhere on or near the surface of the Earth. Generally, a minimum of four satellites must be visible for accurate determination of user location.

The constellation of satellites are in documented orbits where the position of each satellite, at any time, may be precisely known. A GPS receiver at the user terminal receives the multiplicity of signals transmitted simultaneously from the GPS satellites and determines its position, ie., user terminal position, by computing the relative times of arrival of such signals. The signals transmitted by the satellites include, as part of their navigation message, data on the orbital position of the satellite, so-called "ephemeris data", as well as clock correction data. The process of searching for appropriate GPS satellites and receiving the satellite signals, demodulating the ephemeris data for at least four of the satellites and computing the location of the GPS receiver at the user terminal from this data is a lengthy process, often requiring several minutes or more. Processing times of several minutes or more are generally unacceptable in portable devices as they greatly reduce battery life.

Virtually all known GPS receivers utilize correlation methods to compute the pseudo-range for each satellite. The pseudo-ranges are simply the time delays measured between the received signal from each satellite and a local clock at the GPS receiver. These correlation methods are generally performed in real time, and often with hardware correlators. Since a GPS is generally a CDMA (Code Division Multiple Access) system, all of the satellite signals are broadcast on the same frequency but with different code sequences. These code sequences are generally high rate repetitive signals which have a binary phase-reversal rate, also known as the "chipping" or "flipping" rate, of 1.023 MHz and a repetition period of 1,023 chips for a code period of 1 milli-second. Each GPS satellite broadcasts a signal with a unique code sequence.

In order to receive a GPS signal from a given GPS satellite, the receiver hardware multiplies the received signal by a stored replica of the appropriate code sequence contained within the GPS receiver's local memory and sums the output of this process for 1 to 20 milli-seconds. It should be noted that there must be exact synchronization between the code sequence contained within the GPS receiver and the code sequence broadcast by the satellite; if you are only one bit or chip off in "syncing-up" with the code sequence from the GPS satellite, you will not see the signal.

Acquisition of a GPS signal occurs by sequentially adjusting the relative timing, which is defined as code phase, of the stored replica code sequence in the GPS receiver relative to the received signal broadcast by the satellite, and observing the correlation output. As previously mentioned, the alignment of the code phase must be within less than one chip of the sequence for any measurable response. This might mean searching for a response by trying up to all 1,023 possible code phase positions. Additionally, as the integration time is from 1 to 20 milli-seconds, the RF (or IF) frequency used in the correlation process must match the received GPS signal frequency within 700 to 30 Hz, respectively, for maximum correlation response. Since Doppler shifts of up to 5,000 Hz may occur on the GPS signals, the acquisition process must include trying various RF (or IF) frequencies of the replica signal until the correlation response is detected. Once correlation occurs, the GPS receiver can determine the time delay between the received signal and a local clock. The initial determination of the presence of this output is termed "acquisition".

Once acquisition occurs, the process enters the tracking phase in which the timing of the local reference is adjusted in small amounts in order to maintain a high correlation output. The correlation output during the tracking phase may be viewed as the GPS signal with the pseudo-random code removed, or, in common terminology, "despread". This despread signal can then be further demodulated to obtain the 50 bits/sec navigation message that is superimposed on the GPS code sequence coming down from the satellite. This navigation message provides the rest of the information needed to obtain the mathematical solution of where the user terminal is located.

Generally, GPS receivers suffer from lack of sensitivity such that they must always work outdoors with a clear line of sight to all satellites. In other words, at least four GPS satellites must be clearly in view to the GPS receiver, without obstruction. As such, GPS receivers generally encounter problems, and may actually be unusable, in portable applications or in areas where there is significant foliage or other obstruction such as building blockage or in-building applications.

Prior solutions to these problems have used an auxiliary system to supply all of the information that could be obtained at the GPS receiver by demodulating the GPS satellite signals directly on a separate communication channel, i.e., an auxiliary channel. While these prior solutions worked, they required the user terminal to communicate with a server within the auxiliary system to obtain the necessary information every time that a location fix was desired by the user terminal. Since a charge would invariably be levied for this service, it was desired to create a method whereby these charges could be avoided and yet the GPS still work in an obstructed environment, with one or more of the GPS satellite signals up to 20 dB weaker than normal.

The present invention is directed toward overcoming one or more of the above-mentioned problems.

SUMMARY OF THE INVENTION

A method is provided for determining the position of a user terminal utilizing global positioning system (GPS) satellites, each of the GPS satellites transmitting a signal containing information indicative of the orbital parameters of the respective GPS satellite, timing and synchronization data and clock correction parameters. The information for each satellite in view of the user terminal is sent to the user terminal, via a communications link, from an auxiliary communications system having a central server with a GPS receiver that has demodulated the signal. Also sent to the user terminal is the approximate location of the user terminal with respect to a location remote from the user terminal. The (most basic) method includes the steps of searching for and acquiring code phase synchronization of at least four (4) GPS signals, demodulating at least one of the GPS signals that is at a sufficiently high enough signal level to permit demodulation, and obtaining time of week data and timing synchronization from the demodulated GPS signal. The information (time of week data and timing synchronization) so obtained is then utilized for a final location solution by using the time of week information inserted into the orbital parameters to locate the satellite positions at the time of the code phase measurements. The code phase measurements, clock correction data, satellite locations and approximate user location are then used to solve for precise user location.

In one aspect, the step of searching for and acquiring code phase synchronization is facilitated by using the satellite locations and approximate user location to calculate an expected range of Doppler frequencies for each satellite to narrow the search space for the GPS signals.

In another aspect, the location remote from the user terminal includes a cellular base station included in the auxiliary communications system, wherein the accuracy of the cellular base station of the auxiliary communications system enables calibration of the GPS receiver frequency to further reduce the Doppler frequency ranges that must be searched in order to acquire code phase synchronization of the GPS satellite signals.

In another aspect, the acquisition of code phase synchronization of a first GPS satellite enables the user terminal to calibrate the code phase synchronization timing of the user terminal. The user terminal then calculates a small expected range of possible code phases to search for the remaining second, third, fourth, etc., GPS satellite signals. This is done by calculating the distances from each satellite to the approximate user location, converting to time of flight, correcting this with the broadcast clock correction data, and finding the residual of these values modulo 1 millisecond. All of these values have a bias error due to the lack of synchronization between the GPS system and the user terminal, wherein this bias error is removed by the first GPS satellite code phase synchronization measurement.

In another aspect, the process of finding the first GPS signal with the strongest signal level can be sped up by restricting the search for the first GPS signal to be done with relatively short integration times approximating 1 to 10 milli-seconds of total integration time (both coherent and noncoherent).

In another aspect, finding the strongest GPS satellite signal first and demodulating the first strong GPS signal to obtain exact time information, permits refinement of the satellite locations and thus a further reduction of the expected code phase search range for the remaining GPS satellite signals (two, three, four, etc.).

In yet another aspect, the step of approximating a ground location of the user terminal with respect to a location remote from the user terminal includes the step of communicating with an auxiliary communications system remote from the user terminal to determine approximately the ground location of the user terminal with respect to a cellular base station included in the communications system, the cellular base station having a known location.

In still another aspect, the orbital data and clock correction data are not obtained from the central server via the communications link, but have been retained at the user terminal from a previous communication and are tested for whether they (the orbital data and clock correction data) are sufficiently current to be used for the location process. If they are not sufficiently current (typically less than 4 hours old from time of issue) then a request is made by the user terminal, via the communications link, for more current data.

In an alternative embodiment, a method is provided for determining the position of a user terminal utilizing global positioning system (GPS) satellites, each of the GPS satellites transmitting a signal containing information indicative of the orbital parameters of the respective GPS satellite, timing and synchronization data and clock correction parameters. The information for each satellite in view of the user terminal is sent to the user terminal, via a communications link, from an auxiliary communications system having a central server with a GPS receiver that has demodulated the signal. Also sent to the user terminal is the approximate location of the user terminal with respect to a location remote from the user terminal. In the user terminal there exists a real time clock that approximates the time of week information needed to calculate the GPS satellite positions from the orbital parameters to within some desired accuracy. The method includes the steps of using the real time clock to calculate the GPS satellite locations, and from these locations calculating a range of Doppler frequencies and a range of expected code phases for each satellite, searching for and acquiring code phase synchronization of at least four (4) GPS signals. The information (code phase measurements) so obtained is then utilized for a final location solution by using the time of week information (from the real time clock) inserted into the orbital parameters to locate the satellite positions at the time of the code phase measurements. The code phase measurements, clock correction data, satellite locations and approximate user location are then used to solve for precise user location.

In one aspect of the alternative embodiment, the real time clock at the user terminal is periodically updated by searching for a GPS signal with a sufficient signal level to demodulate, and obtaining time of week data and timing synchronization from the demodulated GPS signal.

In another aspect of the alternative embodiment, if any of the GPS satellite signals are at a sufficient signal level to demodulate during the location method, then that GPS signal is demodulated to obtain time of week data and timing synchronization which is then used to update the real time clock.

In yet another aspect of the alternative embodiment, the orbital data and clock correction data are not obtained from the central server via the communications link, but have been retained at the user terminal from a previous communication and are tested for whether they (the orbital data and clock correction data) are sufficiently current to be used for the location process. If they are not sufficiently current (typically less than 4 hours old from time of issue) then a request is made by the user terminal, via the communications link, for more current data.

It is an object of the present invention for the user terminal to operate as autonomously as possible when finding user location.

It is a further object of the present invention to avoid a service charge from an auxiliary server every time that a location fix is desired by the user terminal.

It is a further object of the present invention to provide location determination in an obstructed environment, where one or more of the GPS satellite signals is up to 20 dB weaker than normal.

It is still a further object of the present invention to provide location determination without requiring demodulation of at least four GPS satellite signals.

Other aspects, objects and advantages of the present invention can be obtained from a study of the application, the drawings, and the appended claims.

DETAILED DESCRIPTION OF THE PREFERRED EMBODIMENT

Figure 1:
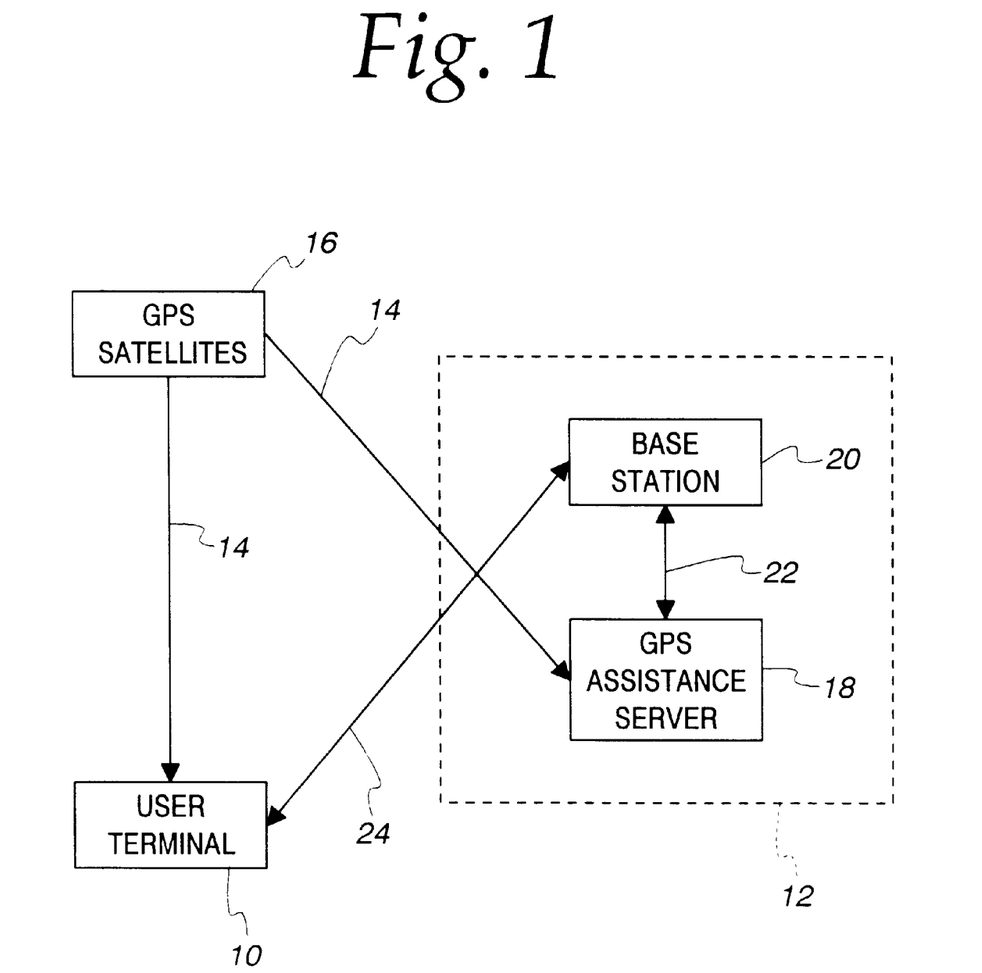
FIG. 1 illustrates a block diagram of a GPS environment for use with the present invention.

FIG. 1 illustrates a block diagram of a GPS environment for use with the present invention. Both a user terminal 10 and an auxiliary communications system 12 receive navigation messages 14 from a cluster or constellation of Earth-orbiting GPS satellites 16. The navigation messages, or GPS signals, 14 include satellite orbital positioning data, i.e., "ephemeris data", as well as clock correction data, and are constantly transmitted by the GPS satellites 16 as they orbit around the Earth.

The user terminal 10 may be any type of mobile communications device, such as, but not limited to, a cellular phone, a land mobile radio, or any other type of wireless communications device used on ships, buoys, land-roving vehicles, etc. The auxiliary communications system 12 may be any type of communications system which includes at least a GPS assistance, or central, server 18 and a base station 20, such as, but not limited to, a cellular phone communications system.

The GPS assistance server 18 periodically receives the navigation messages 14, including the ephemeris and clock correction data, from the GPS satellites 16 and informs the base station 20 via communications link 22. Presuming the user terminal 10 is within a viable communications distance from the base station 20, communication between the user terminal 10 and base station 20 may occur via communications link 24. A typical viable communications distance is 5 miles, however, the present invention is by no means meant to be limited thereto.

It is also possible for the GPS assistance server 18 to receive the ephemeris and clock correction data from sources other than directly from the GPS satellite signals 14. For example, the information (ephemeris and clock correction data) may be obtained from the Internet or from various other private providers.

It is also possible for the GPS assistance server 18 to supply differential correction data to remove the intentional errors in the GPS system. However, this correction data is valid only for short periods of time (approximately 30 seconds). Therefore, while it can be supplied on request, use of this short lifetime correction data defeats the purpose of the user terminal 10 remaining relatively autonomous from the server 18 and communications system 12.

Figure 2:
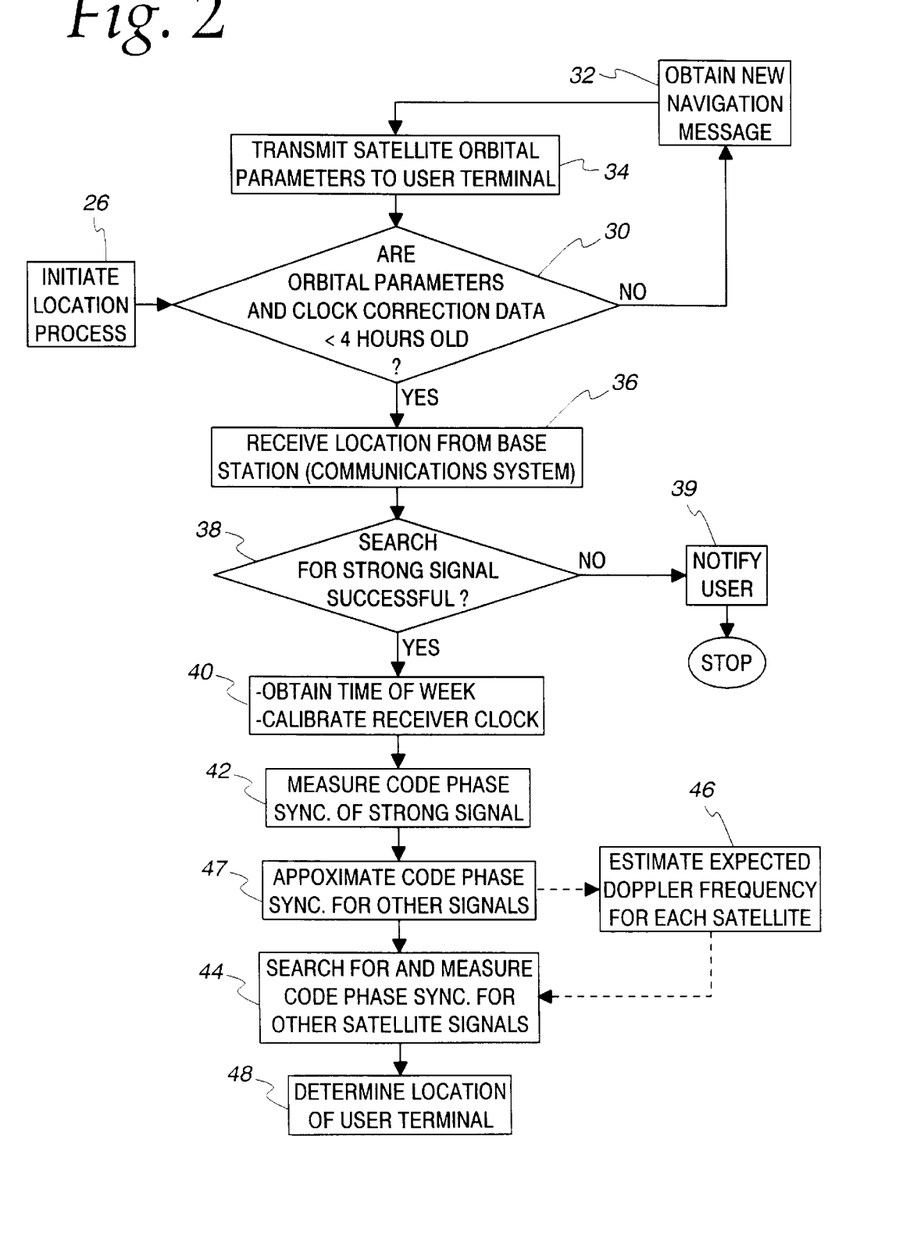
FIG. 2 illustrates a flow chart depicting a method of determining the location of a user terminal utilizing GPS satellite signals.

FIG. 2 depicts a flow chart illustrating a method corresponding to one embodiment for determining on-demand location of the user terminal 10 in the environment depicted in FIG. 1. The present invention makes use of the general concept that ephemeris data from GPS satellites is generally accurate for up to four hours. Once a location on-demand request is initiated, at block 26, at the user terminal 10 by pushing a button, executing a command, etc., the method of FIG. 2 proceeds as follows.

Upon initiation of the location process at block 26, the user terminal 10 determines if the orbital ephemeris data and clock correction data for the satellites in view, which have been stored in the user terminal 10 from a prior communication, are less than four (4) hours old at block 30. If not, the user terminal 10 instructs the communications system 12 to obtain current ephemeris data and clock correction data for the satellites currently in view, at block 32, and to transmit this data, at block 34, to the user terminal 10, via the communications link 24.

Whether using old stored data that is still current or newly obtained data, the user terminal 10 then obtains its approximate location from the communications system 12, and more particularly from the base station 20 (the base station 20 having a known location) via communications link 24, at block 36. Basically, at block 36, the user terminal 10 talks to a particular base station 20 associated with the communications system 12, wherein the base station 20 tells the user terminal 10 its (the user terminal's) approximate location in latitude, longitude and altitude from the base station 20. This location information may be available through an FCC initiative to make cellular operators report base station locations for emergency calls. An alternative method is to develop a translation table between system ID numbers and location. Still another alternative, with a particular eye toward an IS-95 system, is to obtain the latitude and longitude from the base station message. Preferably, the method of FIG. 2 presumes that user terminal's 10 location from the base station 20 can be approximated within at least a 150 km radius, however, this should not be considered limitative. Location to within smaller ranges will reduce the code phase search space.

The user terminal 10 then searches for a first GPS satellite signal at block 38. It will be beneficial both for the subsequent search for further GPS satellite signals and for the fastest acquisition time of this first GPS satellite signal, if this first search process is tailored for the acquisition of a GPS signal with sufficient signal strength that can be demodulated. (It should be noted that GPS signals can be acquired, and code phase synchronization measured, even though the GPS signals are too weak to be demodulated for the navigation message.) The search for a strong GPS satellite signal, i.e., strong enough to demodulate, is accomplished by limiting the integration time to between 1 to 10 milli-seconds total time (both coherent and noncoherent). This serves the dual purpose of limiting the response to only the strongest signals and greatly reducing the time spent searching for this first GPS satellite signal. If a strong enough signal cannot be found, the method of FIG. 2 terminates and the user may be notified that a location determination cannot be made at this time at block 39.

Once the user terminal 10 locates a GPS satellite signal of sufficient strength, the signal is conventionally demodulated to obtain the time of week of the signal in terms of seconds from midnight Sunday (obtain time synchronization with the GPS system), and the receiver clock at the user terminal 10 is calibrated at block 40. After the receiver clock is calibrated at block 40, the code phase synchronization of the strong signal can be measured at block 42. The code phase synchronization is essentially the residual, modulo 1 millisecond, of the time delay of the code sequence broadcast from the first GPS satellite 16.

The information obtained so far (time of week information and code phase synchronization) is now utilized to enhance the search for further GPS satellite signals. This will involve two different calibrations of the user terminal 10 based on this new information: (1) using time to refine the satellite locations to better predict the expected range of code phases and Doppler frequencies over which to search; and (2) calibration of the code phase correlator to both take advantage of the reduced code phase and Doppler search ranges, and to better process the signal enabling weaker signal reception.

It is contemplated to reduce the search time for at least three other GPS satellite signals, at block 44, whose code phase synchronizations are to be measured, by estimating both the expected Doppler frequency for each GPS satellite 16 at block 46 and the relative code phase synchronizations calculated (by simply geometry) from a knowledge of the approximate user terminal 10 location and the satellite locations (and satellite velocities) at block 47, these latter quantities now being fixed by knowledge of time. Thus, by better approximating the expected code phase and Doppler frequency ranges in which the other GPS satellites 16 should be located, the search time for these satellites 16 can be decreased at block 44. Allowing for some tolerance, it is contemplated that these ranges should be capable of being predicted within approximately a 30 micro-second error (equivalent of five miles). In comparison, the total ambiguity of not knowing anything about the code phase synchronization amounts to an uncertainty of approximately 1 milli-second.

The calibration of the code phase correlator at the user terminal 10 is an important consequence of the acquisition of the first GPS signal. Using the refined GPS satellite location as previously determined and the approximate user terminal 10 location, the distance between those two points can be predicted. Dividing by the speed of light, the time of flight of the GPS signal between those two points can be calculated. Taking the residual, modulo 1 milli-second, of this value would give the predicted code phase synchronization measurement if the correlator was perfectly time aligned with that of the GPS satellite signal generator. Since this obviously cannot occur, there is naturally an ambiguity that occurs when the user terminal 10 starts its correlation process relative to the original signal generation process in the GPS satellite. However, the first measurement of the first GPS satellite code phase synchronization removes this ambiguity. Since this ambiguity is the same for all measurements of all GPS satellite code phases by the user terminal 10, its value may be used to correct all the code phase predictions for the other (at least three) GPS satellite signals. It should be noted that the clock correction data is unique to each satellite and unique in time, so the previously found time information may also be used to calculate the more precise clock corrections for each GPS satellite signal, and these corrections must be applied to the time of flights between each of them and the approximate user terminal 10 location. An example is set forth below:

| Satellite Number | Distance to satellite (km) | Time of flight (milli-seconds) | Clock correction (milli-seconds) | Predicted Code Phase (milli-seconds) | Predicted Code Phase (chip #) |
| --- | --- | --- | --- | --- | --- |
| 1 | 25,000 | 83.3 | 0.03 | 0.27 | 263.9 |
| 2 | 24,200 | 80.7 | 0.01 | 0.69 | 674.5 |
| 3 | 22,650 | 75.5 | −0.08 | 0.58 | 567.0 |
| 4 | 27,050 | 90.2 | 0.05 | 0.15 | 146.6 |

The predicted code phase chip number is obtained from the predicted code phase time by dividing by 1,023, i.e., the number of chips in a milli-second. If the first GPS satellite code phase is measured at 304.1 chips, the difference between this value and the ideal predicted value (263.9) is 40.2 chips. This value (40.2) must be added to all the remaining predicted code phases to yield the code phase center value for the code phase search ranges. This results in the following predicted code phases for the remaining GPS satellites:

| Satellite Number | Predicted Code Phase (chip #) |
| --- | --- |
| 2 | 714.7 |
| 3 | 607.2 |
| 4 | 186.8 |

Thus, by estimating the expected Doppler frequency for each GPS satellite 16 at block 46 and approximating the code phase synchronizations for at least three other signals at block 47, the user terminal 10 now can search a 30× smaller space, which can be searched much more quickly, for the code phase synchronizations of at least three other GPS satellites to be measured at block 44.

An important improvement in the acquisition process may now occur. Since a sufficiently strong first GPS satellite signal capable of being demodulated has been found, the search for succeeding GPS satellite signals may be tailored even further to enhance the acquisition of weak signals. It is understood that longer coherent integration times are necessary to acquire weaker GPS satellite signals. However, if coherent integration is performed for 20 milli-seconds, the probably that that time will contain a navigation data bit transition, i.e., 1 -to-0 or 0-to-1, and therefore degrade the correlation response, is high. The GPS system of satellites is very coordinated, and these bit transitions occur at coordinated times on the satellites. Using the information previously obtained, and the accurately derived time of flights for each GPS satellite signal, the bit edge transitions for the as yet unacquired GPS satellite signals can be accurately predicted based on the observed bit edge transitions of the first acquired and demodulated GPS satellite signal. Thus, the longest coherent integration time of 20 milli-seconds may be used with no loss in response due to bit edge transitions when searching for the possibly weaker subsequent GPS signals.

The code phase synchronization is measured for all the other GPS satellites 16, regardless of whether their signal level is below the level necessary for data demodulation (the code phase synchronization may be measured even though the signal is too weak to demodulate). The code phase synchronizations may be measured by long coherent integration times, out to 20 milli-seconds because the data bit edge time is known with sufficient time accuracy, by multiple noncoherent summations of these coherent integration results, and by a three-point interpolation of prompt and neighboring ½ chip integrations for each satellite. If long integration is necessary to measure the code phase synchronizations, reducing the search range becomes especially useful since one would want to reduce the code phase synchronization space required to be searched for the satellite as much as possible.

Once the code phase synchronizations are measured for at least four of the satellites 16, the location of the user terminal 10 can be conventionally determined/calculated at block 48. Such a calculation generally includes the steps of fixing the satellite locations with the ephemeris data and corrected receiver time; calculating the pseudo-ranges by adding together the code phases, the required integer number of milli-seconds derived from the satellites and user positions, and the satellite clock correction data. The direction unit vector matrix H is then derived for the satellites used and inverted. The delta pseudo-ranges are then derived from a measured and predicted location of the user terminal 10. Corrections to the user location are then obtained by multiplying the inverted H matrix and delta pseudo-ranges to arrive at the location of the user terminal 10.

Thus, the method according to FIG. 2 finds particular utility in a situation where the user terminal 10 cannot locate four GPS satellite signals of sufficient strength to demodulate. If at least one satellite signal strong enough to demodulate can be found, a location determination can still be made. Further, the method according to FIG. 2 also reduces the search time for the satellites. For instance, prior to searching for a satellite signal strong enough to demodulate at block 38, the user terminal 10 already has knowledge of approximately where the satellites 16 are located (blocks 30 and 34) and where the user terminal 10 is located with respect to a base station, the base station having a known location (block 36). This knowledge aids in reducing the initial search time for a satellite signal strong enough to demodulate.

Further, after the code phase synchronization of the strong signal is measured at block 42, by approximating the code phase synchronizations for the other GPS satellite signals (block 47) and estimating the expected Doppler frequency for each satellite (block 46), the search time for the other GPS satellite signals may be reduced by a magnitude of approximately 30×. As previously noted, this reduction in search time is particularly useful if long integration is required to measure the code phase synchronizations.

Figure 3:
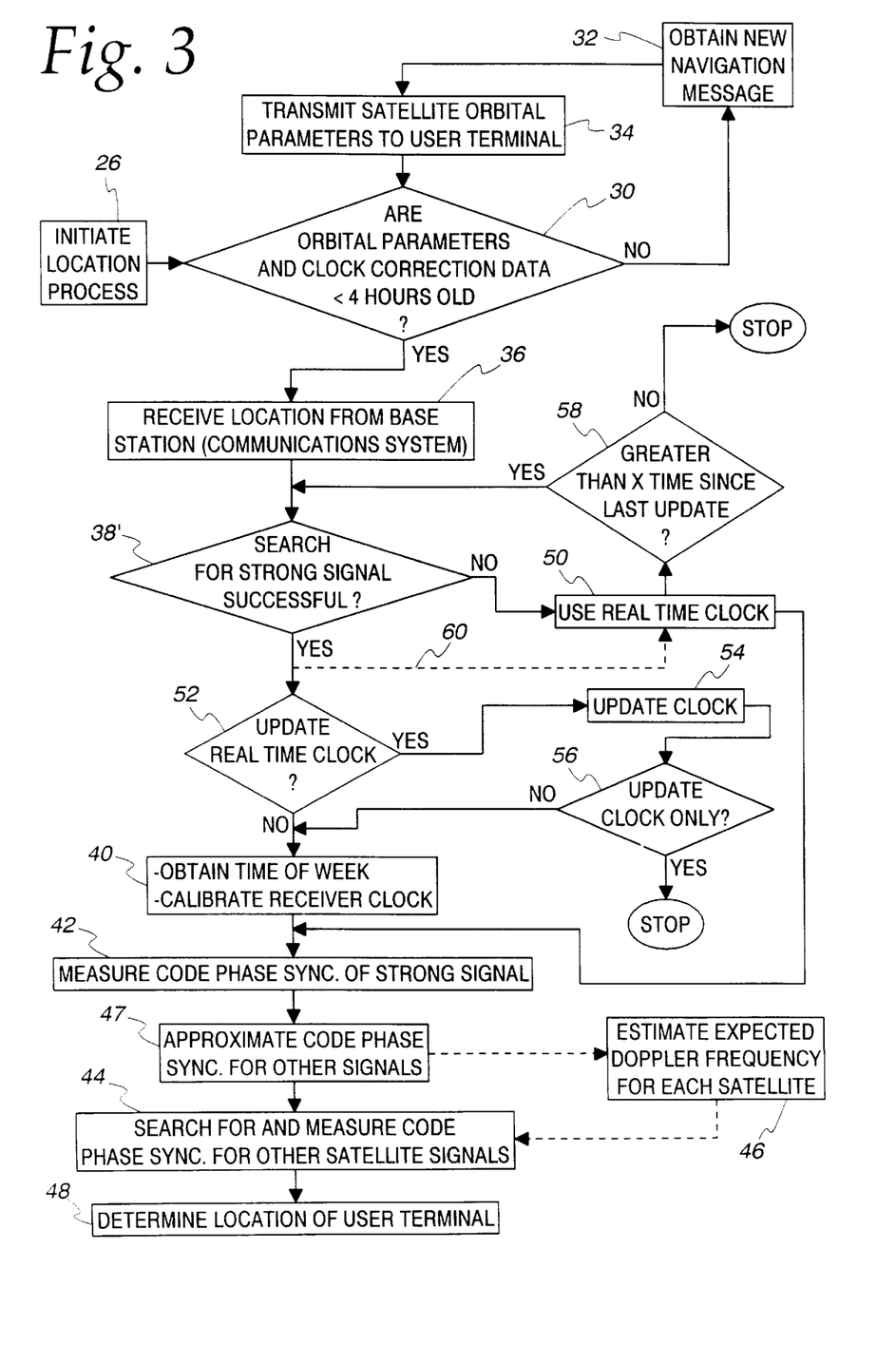
FIG. 3 illustrates a flow chart depicting an alternative method of determining the location of a user terminal utilizing GPS satellite signals.

FIG. 3 depicts an alternative embodiment of the user location method shown in FIG. 2, with like steps indicated by the same reference numbers and those steps which have been slightly modified indicated with a prime ('). Generally, the embodiment of FIG. 3 implements a real time clock at the user terminal 10 which may be used if a satellite signal strong enough to be demodulated cannot be obtained at block 38'.

The method of FIG. 3 proceeds through blocks 26, 30, 32, 34 and 36 as previously described with respect to FIG. 2. After receiving the user terminal's 10 approximate location from the base station 20 at block 36, the user terminal 10 searches for a GPS satellite signal strong enough to demodulate at block 38' in the same manner as previously described with respect to FIG. 2. However, if no satellite signal strong enough to demodulate can be found, the method of FIG. 3 proceeds to block 50 and uses the real time clock at the user terminal 10 to approximate the time of week in seconds from midnight Sunday of the first GPS satellite signal and calibrate the receiver clock (block 40). The code phase synchronization of this satellite signal is measured at block 42 using the real time clock to approximate the time of week information, and the method of FIG. 3 proceeds through blocks 44, 46, 47 and 48 to determine the location of the user terminal 10 as previously described with respect to FIG. 2, albeit using the real time clock as the time of week information.

If a satellite signal strong enough to demodulate is found at block 38', the method proceeds to block 52 where it is determined if it is desired to update the real time clock at the user terminal 10. If not, the method proceeds through blocks 40, 42, 44, 46, 47 and 48 to determine the location of the user terminal 10 as previously described with respect to FIG. 2.

If the real time clock is to be updated, the real time clock is updated at block 54 and the method determines whether it was to only update the real time clock at block 56. If yes, the method stops; if no, the method proceeds through blocks 40, 42, 44, 46, 47 and 48 to determine the location of the user terminal 10 as previously described with respect to FIG. 2.

This method offers the further advantage that at block 50, the system also proceeds to determine when the last update of the real time clock occurred at block 58, and if the last update time is greater than a predetermined time, the system proceeds to block 38' to search for a signal strong enough to demodulate to update the real time clock. It should be noted that even if the real time clock requires updating, it can still be used to approximate the time of week information. Further, it should be noted that even if a signal strong enough to demodulate is located at block 38', the real time clock at the user terminal 10 can still be utilized as indicated by dotted arrow 60.

The process of updating the real time clock at the user terminal 10 may be done automatically. The GPS receiver at the user terminal 10 may be programmed to turn on periodically (once an hour or every few hours or at certain times of the day, etc.) to search for any "loud" (capable of being demodulated) GPS satellite signals. If one is found, the signal may be demodulated in approximately six seconds or less to obtain the time of week information, which in turn is used to update the real time clock at the user terminal 10. Periodically updating the real time clock helps to ensure that when a location determination request is initiated, and there are no "loud" GPS satellite signals available from which to obtain the time of week information, then the real time clock may be used to approximate the time of week information with acceptable accuracy.

The above-described systems and methods are particularly useful where it is desired to make a location measurement in an environment where there is a different loss out to each satellite. Such a situation may occur if the user terminal 10 is situated in an urban canyon, where there would be less loss to a satellite overhead than to other satellites distant to the horizon. For instance, if the other satellites are coming down through some trees because they are too low to the horizon, or a signal is sufficiently weak that you can't demodulate it in the normal way, but the signal is strong enough that you can still acquire it and measure its code phase, then the above-described systems and methods become particularly useful. The time of week information may be obtained from one sufficiently strong satellite signal, or the real time clock at the GPS receiver GPS satellite signal strong enough to demodulate cannot be located, and used to calculate the rest of the orbital positions for the other satellites so that you do not have to demodulate these signals, you can just find their code phase synchronizations. The above-described systems and methods make use of the fact that the code phase synchronization can still be obtained from a satellite signal even though the signal is sufficiently weak that it cannot be demodulated. There is about a 10 dB difference from where the signal can no longer be demodulated and where the code phase synchronization is lost.

All of the above-described systems and methods have the presumption that there is a premium on obtaining rapid location fix on demand, and/or that the situation will often be such that four (4) sufficiently strong GPS satellite signals are not available to obtain the navigation messages. However, it is trivial to include a mode of operation that is identical to the normal usage of a GPS receiver in the event that obtaining the orbital parameters and clock corrections from the GPS server 18 is not possible or desirable.

While the invention has been described with particular reference to the drawings, it should be understood that various modifications could be made without departing from the spirit and scope of the present invention.

What is claimed is:

1. A method for determining the position of a user terminal utilizing global positioning system (GPS) satellites, each of the GPS satellites transmitting a signal containing information indicative of the orbital parameters of the respective GPS satellite, timing and synchronization data and clock correction parameters, said method comprising the steps of:

approximating an expected range of Doppler frequencies within which at least one GPS satellite should be located;

within this range, searching for and acquiring a first GPS signal from a first GPS satellite at the user terminal strong enough to demodulate, the first GPS signal containing information indicative of the orbital parameters of the first GPS satellite, timing and synchronization data and clock correction parameters;

demodulating the first GPS signal to obtain time of week information;

measuring code phase synchronization for the first GPS signal utilizing the time of week information;

searching for and acquiring second, third and fourth GPS signals at the user terminal from second, third and fourth GPS satellites, respectively;

measuring code phase synchronizations for the second, third and fourth GPS signals utilizing the time of week information; and calculating the position of the user terminal utilizing the code phase synchronizations of the first through fourth GPS signals.

2. The method of claim 1, wherein the step of approximating an expected range of Doppler frequencies within which at least one GPS satellite should be located comprises the steps of:

approximating an orbital location of the at least one GPS satellite;

approximating a ground location of the user terminal with respect to a location remote from the user terminal; and using the orbital and ground location approximations to calculate the expected range of Doppler frequencies.

3. The method of claim 2, wherein the step of approximating an orbital location of the at least one GPS satellite comprises the steps of:

receiving orbital parameters and clock correction data of the at least one GPS satellite at the user terminal from a communications system remote from the user terminal; and using the orbital parameters and clock correction data to calculate the approximate orbital location of the at least one GPS satellite.

4. The method of claim 2, wherein the step of approximating an orbital location of the at least one GPS satellite comprises the steps of:

testing orbital parameters and clock correction data of the at least one GPS satellite, which have been retained at the user terminal from a previous communication, to see if the retained orbital parameters and clock correction data are sufficiently current;

if the retained orbital parameters and clock correction data are determined to be sufficiently current, using the retained orbital parameters and clock correction data to calculate the approximate orbital location of the at least one GPS satellite; and if the retained orbital parameters and clock correction data are determined to not be sufficiently current, requesting and receiving, from a communications system remote from the user terminal, current orbital parameters and clock correction data of the at least one GPS satellite at the user terminal; and using the current orbital parameters and clock correction data to calculate the approximate orbital location of the at least one GPS satellite.

5. The method of claim 4, wherein the retained orbital parameters and clock correction data are considered sufficiently current if they are less than four hours old from time of issue.

6. The method of claim 2, wherein the step of approximating a ground location of the user terminal with respect to a location remote from the user terminal comprises the step of:

communicating with a communications system remote from the user terminal to determine approximately the ground location of the user terminal with respect to a base station included in the communications system, said base station having a known location.

7. The method of claim 6, wherein the base station comprises a cellular base station.

8. The method of claim 1, wherein the step of searching for and receiving second, third and fourth GPS signals at the user terminal from second, third and fourth GPS satellites, respectively, comprises the steps of:

approximating an expected range of Doppler frequencies within which the second, third and fourth GPS satellites should be located; and within this range, searching for and acquiring the second, third and fourth GPS signals at the user terminal from the second, third and fourth GPS satellites, respectively.

9. The method of claim 8, wherein the step of approximating an expected range of Doppler frequencies within which the second, third and fourth GPS satellites should be located comprises the steps of:

approximating orbital locations of the second, third and fourth GPS satellites;

approximating a ground location of the user terminal with respect to a location remote from the user terminal; and using the orbital and ground location approximations to calculate the expected range of Doppler frequencies.

10. The method of claim 9, wherein the step of approximating orbital locations of the second, third and fourth GPS satellites comprises the steps of:

receiving orbital parameters and clock correction data of the second, third and fourth GPS satellites at the user terminal from a communications system remote from the user terminal; and using the orbital parameters and clock correction data to calculate the approximate orbital locations of the second, third and fourth GPS satellites.

11. The method of claim 9, wherein the step of approximating orbital locations of the second, third and fourth GPS satellites comprises the steps of:

testing orbital parameters and clock correction data of the second, third and fourth GPS satellites, which have been retained at the user terminal from a prior communication, to see if the retained orbital parameters and clock correction data are sufficiently current;

if the retained orbital parameters and clock correction data are determined to be sufficiently current, using the retained orbital parameters and clock correction data to calculate the approximate orbital locations of the second, third and fourth GPS satellites; and if the retained orbital parameters and clock correction data are determined to not be sufficiently current, requesting and receiving, from a communications system remote from the user terminal, current orbital parameters and clock correction data of the second, third and fourth GPS satellites at the user terminal; and using the current orbital parameters and clock correction data to calculate the approximate locations of the second, third and fourth GPS satellites.

12. The method of claim 11, wherein the retained orbital parameters and clock correction data are considered sufficiently current if they are less than four hours old from time of issue.

13. The method of claim 9, wherein the step of approximating a ground location of the user terminal with respect to a location remote from the user terminal comprises the step of:

communicating with a communications system remote from the user terminal to determine approximately the ground location of the user terminal with respect to a base station included in the communications system, said base station having a known location.

14. The method of claim 13, wherein the base station comprises a cellular base station.

15. The method of claim 8, wherein the step of searching for and acquiring second, third and fourth GPS signals at the user terminal from second, third and fourth GPS satellites, respectively, further comprises the steps of:

approximating an expected range of code phase space within which the second, third and fourth GPS satellites should be located; and within this range, searching for and acquiring the second, third and fourth GPS signals at the user terminal from the second, third and fourth GPS satellites, respectively.

16. The method of claim 15, wherein the steps of searching for and acquiring the second, third and fourth GPS signals comprises the step of:

performing long coherent integration to search for and acquire the second, third and fourth GPS signals from the second, third and fourth GPS satellites, respectively.

17. The method of claim 15, wherein the step of approximating an expected range of code phase space within which the second, third and fourth GPS satellites should be located comprises the steps of:

approximating orbital locations of the second, third and fourth GPS satellites;

refining the orbital location approximations utilizing the time of week information;

approximating a ground location of the user terminal with respect to a location remote from the user terminal; and using the ground and refined orbital approximations to calculate the expected range of code phase space.

18. A method for determining the position of a user terminal utilizing global positioning system (GPS) satellites, each of the GPS satellites transmitting a signal containing information indicative of the orbital parameters of the respective GPS satellite, timing and synchronization data and clock correction parameters, said method comprising the steps of:

approximating an expected range of Doppler frequencies within which at least one GPS satellite should be located;

within this range, searching for a first GPS satellite signal strong enough to demodulate;

if the first GPS satellite signal strong enough to demodulate is located, acquiring and demodulating the first GPS satellite signal to obtain time of week information;

if the first GPS satellite signal strong enough to demodulate cannot be located, acquiring the first GPS satellite signal at the user terminal and utilizing a real time clock at the user terminal to approximate time of week information;

measuring code phase synchronization for the first GPS satellite signal utilizing the time of week information;

searching for and acquiring second, third and fourth GPS satellite signals at the user terminal from second, third and fourth GPS satellites, respectively;

measuring code phase synchronizations for the second, third and fourth GPS satellite signals utilizing the time of week information; and calculating the position of the user terminal utilizing the code phase synchronizations of the first through fourth GPS satellite signals.

19. The method of claim 18, wherein the real time clock at the user terminal is periodically updated by:

searching for and acquiring a GPS satellite signal at the user terminal having a sufficient signal level to demodulate; and demodulating the acquired GPS satellite signal to obtain time of week information, wherein the real time clock at the user terminal is updated with the obtained time of week information.

20. The method of claim 18, further comprising the step of:

if the first GPS satellite signal is strong enough to be demodulated, updating the real time clock at the user terminal with the time of week information obtained from demodulating the first GPS satellite signal.

21. The method of claim 18, wherein the real time clock at the user terminal is utilized to approximate the time of week information regardless of whether the first GPS satellite signal is strong enough to demodulate.

22. The method of claim 18, wherein the step of approximating an expected range of Doppler frequencies within which at least one GPS satellite should be located comprises the steps of:

approximating an orbital location of the at least one GPS satellite;

approximating a ground location of the user terminal with respect to a location remote from the user terminal; and using the orbital and ground location approximations to calculate the expected range of Doppler frequencies.

23. The method of claim 22, wherein the step of approximating an orbital location of the at least one GPS satellite comprises the steps of:
   receiving orbital parameters and clock correction data of the at least one GPS satellite at the user terminal from a communications system remote from the user terminal; and
   using the orbital parameters and clock correction data to calculate the approximate orbital location of the at least one GPS satellite.

24. The method of claim 22, wherein the step of approximating an orbital location of the at least one GPS satellite comprises the steps of:
   testing orbital parameters and clock correction data of the at least one GPS satellite, which have been retained at the user terminal from a previous communication, to see if the retained orbital parameters and clock correction data are sufficiently current;
   if the retained orbital parameters and clock correction data are determined to be sufficiently current, using the retained orbital parameters and clock correction data to calculate the approximate orbital location of the at least one GPS satellite; and
   if the retained orbital parameters and clock correction data are determined to not be sufficiently current,
      requesting and receiving, from a communications system remote from the user terminal, current orbital parameters and clock correction data of the at least one GPS satellite at the user terminal; and
      using the current orbital parameters and clock correction data to calculate the approximate orbital location of the at least one GPS satellite.

25. The method of claim 24, wherein the retained orbital parameters and clock correction data are considered sufficiently current if they are less than four hours old from time of issue.

26. The method of claim 22, wherein the step of approximating a ground location of the user terminal with respect to a location remote from the user terminal comprises the step of:
   communicating with a communications system remote from the user terminal to determine approximately the ground location of the user terminal with respect to a base station included in the communications system, said base station having a known location.

27. The method of claim 26, wherein the base station comprises a cellular base station.

28. The method of claim 18, wherein the step of searching for and receiving second, third and fourth GPS signals at the user terminal from second, third and fourth GPS satellites, respectively, comprises the steps of:
   approximating an expected range of Doppler frequencies within which the second, third and fourth GPS satellites should be located; and
   within this range, searching for and acquiring the second, third and fourth GPS signals at the user terminal from the second, third and fourth GPS satellites, respectively.

29. The method of claim 28, wherein the step of approximating an expected range of Doppler frequencies within which the second, third and fourth GPS satellites should be located comprises the steps of:
   approximating orbital locations of the second, third and fourth GPS satellites;

approximating a ground location of the user terminal with respect to a location remote from the user terminal; and
   using the orbital and ground location approximations to calculate the expected range of Doppler frequencies.

30. The method of claim 29, wherein the step of approximating orbital locations of the second, third and fourth GPS satellites comprises the steps of:
   receiving orbital parameters and clock correction data of the second, third and fourth GPS satellites at the user terminal from a communications system remote from the user terminal; and
   using the orbital parameters and clock correction data to calculate the approximate orbital locations of the second, third and fourth GPS satellites.

31. The method of claim 29, wherein the step of approximating orbital locations of the second, third and fourth GPS satellites comprises the steps of:
   testing orbital parameters and clock correction data of the second, third and fourth GPS satellites, which have been retained at the user terminal from a prior communication, to see if the retained orbital parameters and clock correction data are sufficiently current;
   if the retained orbital parameters and clock correction data are determined to be sufficiently current, using the retained orbital parameters and clock correction data to calculate the approximate orbital locations of the second, third and fourth GPS satellites; and
   if the retained orbital parameters and clock correction data are determined to not be sufficiently current,
      requesting and receiving, from a communications system remote from the user terminal, current orbital parameters and clock correction data of the second, third and fourth GPS satellites at the user terminal; and
      using the current orbital parameters and clock correction data to calculate the approximate locations of the second, third and fourth GPS satellites.

32. The method of claim 31, wherein the retained orbital parameters and clock correction data are considered sufficiently current if they are less than four hours old from time of issue.

33. The method of claim 29, wherein the step of approximating a ground location of the user terminal with respect to a location remote from the user terminal comprises the step of:
   communicating with a communications system remote from the user terminal to determine approximately the ground location of the user terminal with respect to a base station included in the communications system, said base station having a known location.

34. The method of claim 33, wherein the base station comprises a cellular base station.

35. The method of claim 28, wherein the step of searching for and acquiring second, third and fourth GPS signals at the user terminal from second, third and fourth GPS satellites, respectively, further comprises the steps of:
   approximating an expected range of code phase space within which the second, third and fourth GPS satellites should be located; and
   within this range, searching for and acquiring the second, third and fourth GPS signals at the user terminal from the second, third and fourth GPS satellites, respectively.

36. The method of claim 35, wherein the steps of searching for and acquiring the second, third and fourth GPS signals comprises the step of:
   performing long coherent integration to search for and acquire the second, third and fourth GPS signals from the second, third and fourth GPS satellites, respectively.

37. The method of claim 35, wherein the step of approximating an expected range of code phase space within which the second, third and fourth GPS satellites should be located comprises the steps of:

approximating orbital locations of the second, third and fourth GPS satellites;

refining the orbital location approximations utilizing the time of week information;

approximating a ground location of the user terminal with respect to a location remote from the user terminal; and using the ground and refined orbital approximations to calculate the expected range of code phase space.

* * * * *

UNITED STATES PATENT AND TRADEMARK OFFICE
CERTIFICATE OF CORRECTION

PATENT NO. : 6,075,987
DATED : June 13, 2000
INVENTOR(S) : William O. Camp, Jr. and Thomas J. Makovicka It is certified that error appears in the above-identified patent and that said Letters Patent is hereby corrected as shown below:

[75] Inventors: William O. Camp, Jr., Chapel Hill;
Thomas J. Makovicka, Raleigh, Both of N.C.

Signed and Sealed this

Twelfth Day of June, 2001

Attest:

*Attesting Officer*

NICHOLAS P. GODICI
*Acting Director of the United States Patent and Trademark Office*